United States Patent
Sonoda et al.

(10) Patent No.: US 10,894,291 B2
(45) Date of Patent: Jan. 19, 2021

(54) METHOD FOR MANUFACTURING SINTERED COMPONENT AND SINTERED COMPONENT

(71) Applicant: SUMITOMO ELECTRIC SINTERED ALLOY, LTD., Takahashi (JP)

(72) Inventors: Yasunori Sonoda, Takahashi (JP); Ryota Take, Takahashi (JP)

(73) Assignee: Sumitomo Electric Sintered Alloy, Ltd., Takahashi (JP)

( * ) Notice: Subject to any disclaimer, the term of this patent is extended or adjusted under 35 U.S.C. 154(b) by 53 days.

(21) Appl. No.: 15/535,282

(22) PCT Filed: Dec. 8, 2015

(86) PCT No.: PCT/JP2015/084433
§ 371 (c)(1),
(2) Date: Jun. 12, 2017

(87) PCT Pub. No.: WO2016/093245
PCT Pub. Date: Jun. 16, 2016

(65) Prior Publication Data
US 2017/0320137 A1    Nov. 9, 2017

(30) Foreign Application Priority Data
Dec. 12, 2014    (JP) ................. 2014-252532

(51) Int. Cl.
*B22F 3/16* (2006.01)
*C22C 38/00* (2006.01)
(Continued)

(52) U.S. Cl.
CPC .............. *B22F 3/162* (2013.01); *B22F 1/007* (2013.01); *C22C 38/00* (2013.01); *C22C 38/04* (2013.01);
(Continued)

(58) Field of Classification Search
CPC ............. B22F 3/16; B22F 3/162; C22C 38/00
(Continued)

(56) References Cited

U.S. PATENT DOCUMENTS

| 5,378,416 A | 1/1995 | Kishi et al. |
| 5,900,559 A | 5/1999 | Nakamura et al. |

(Continued)

FOREIGN PATENT DOCUMENTS

| CN | 103157834 A | 6/2013 |
| JP | H6-246497 A | 9/1994 |

(Continued)

*Primary Examiner* — Weiping Zhu
(74) *Attorney, Agent, or Firm* — Baker Botts L.L.P.; Michael A. Sartori (57) ABSTRACT

Provided is a method for manufacturing a sintered component having a hole formed therein, in which a sintered component having no defect, such as cracks, can be manufactured with good productivity and also a reduction in tool life accompanied by forming the hole can be suppressed. The method for manufacturing a sintered component includes a molding step of press-molding a raw material powder containing a metal powder and thus fabricating a green body; a drilling step of forming a hole in the green body using a candle-type drill and thus forming a thin-walled portion, of which a thickness Gt as measured between an inner circumferential surface of the hole and an outer surface of the green body is smaller than a diameter Gd of the hole; and a sintering step of sintering the green body after the drilling step.

6 Claims, 3 Drawing Sheets

(51) Int. Cl.
*B22F 1/00* (2006.01)
*C22C 38/18* (2006.01)
*C22C 38/04* (2006.01)
*C22C 38/08* (2006.01)
*C22C 38/16* (2006.01)
*C22C 38/22* (2006.01)
*C22C 38/44* (2006.01)
*C22C 38/12* (2006.01)

(52) U.S. Cl.
CPC ............. *C22C 38/08* (2013.01); *C22C 38/12* (2013.01); *C22C 38/16* (2013.01); *C22C 38/18* (2013.01); *C22C 38/22* (2013.01); *C22C 38/44* (2013.01); *B22F 2301/35* (2013.01); *B22F 2998/10* (2013.01)

(58) Field of Classification Search
USPC ............................................................ 419/1
See application file for complete search history.

(56) References Cited

U.S. PATENT DOCUMENTS

| | | | |
|---|---|---|---|
| 6,113,477 A | * | 9/2000 | Arai .................. B24B 3/32 451/143 |
| 2015/0298353 A1 | * | 10/2015 | Zhang ............... B23D 61/185 125/21 |

FOREIGN PATENT DOCUMENTS

| | | | | |
|---|---|---|---|---|
| JP | 10-073132 A | | | 3/1998 |
| JP | 2000-087107 A | | | 3/2000 |
| JP | 2000176737 A | * | | 6/2000 |
| JP | 2003-117710 A | | | 4/2003 |
| JP | 2003-205410 A | | | 7/2003 |
| JP | 2006-336078 A | | | 12/2006 |
| JP | 2012-254501 A | | | 12/2012 |

* cited by examiner

METHOD FOR MANUFACTURING SINTERED COMPONENT AND SINTERED COMPONENT

TECHNICAL FIELD

The present invention relates to a method for manufacturing a sintered component and a sintered component. In particular, the present invention relates to a method for manufacturing a sintered component having a hole formed therein, in which a sintered component having no defect, such as cracks, can be manufactured with good productivity and also a reduction in tool life accompanied by forming the hole can be suppressed.

BACKGROUND ART

Sintered bodies (sintered components) obtained by sintering green bodies made of a metal powder, such as an iron powder, are used for automobile parts or general machine parts. As kinds of machine parts, automobile parts, such as sprockets, rotors, gears, rings, flanges, pulleys and bearings may be included. In general, such sintered components are manufactured by press-molding a raw material powder containing a metal powder to form a green body and then sintering the green body.

For example, as sintered components used for automobile parts, components are known, in which a through-hole (e.g., an oil hole) or a blind hole, which does not extend therethrough, is formed. The components having a hole, such as a through-hole, formed therein are manufactured by sintering a green body and then performing machining (drilling) thereon by a drill (see Patent Document 1).

As drills used for drilling, a drill, in which a cutting edge on a point portion thereof has a V-shaped projection shape, is typical. In the case of sintered carbide drills, a point angle of the cutting edge is in the order of 130° to 140°.

CITATION LIST

Patent Document

Patent Document 1: Japanese Patent Application Publication No. 2006-336078

SUMMARY OF INVENTION

Technical Problem

A sintered component is much harder than a green body before sintering. The reason is that metal powder particles in the green body are mechanically adhered with each other by only agglomerating a raw material powder by molding, whereas metal powder particles in the sintered component are diffusion-bonded and alloyed with each other by sintering, thereby forming a strong bonding therebetween. Accordingly, if drilling for forming a hole, such as a through-hole, is performed on the sintered component itself, a machining time is increased. As a result, enhancement of productivity is difficult and also a tool life tends to be decreased. Depending on locations on the sintered component, at which machining is performed, there is a risk that defects, such as cracks, are formed on the sintered component.

The present invention has been made keeping in mind the above problems, and one object thereof is to provide a method for manufacturing a sintered component having a hole formed therein, in which a sintered component having no defect, such as cracks, can be manufactured with good productivity and also a reduction in tool life accompanied by forming the hole can be suppressed.

Another object of the present invention is to provide a sintered component having a good productivity.

Solution to Problem

A method for manufacturing a sintered component according to one aspect of the present invention includes a molding step, a drilling step and a sintering step. The molding step is configured to press-mold a raw material powder containing a metal powder and thus to fabricate a green body. The drilling step is configured to form a hole in the green body using a candle-type drill and thus to form a thin-walled portion, of which a thickness Gt as measured between an inner circumferential surface of the hole and an outer surface of the green body is smaller than a diameter Gd of the hole. The sintering step is performed after the drilling step.

A sintered component according to one aspect of the present invention has a hole formed therein and also includes a thin-walled portion having a thickness St as measured between an inner circumferential surface of the hole and an outer surface of the sintered component smaller than a diameter Sd of the hole, wherein a shape of the inner circumferential surface of the hole is a satin finish shape.

Advantageous Effects of Invention

According to the method of manufacturing a sintered component, a sintered component having no defect, such as cracks, can be manufactured with good productivity and also a reduction in tool life accompanied by forming the hole can be suppressed.

The sintered component as described above has a good productivity.

DESCRIPTION OF EMBODIMENTS

Descriptions of Exemplary Embodiments of the Invention

The present inventors have first studied a manufacturing method, which can allow a sintered component having a hole formed therein to be manufactured with good productivity and also can suppress a reduction in tool life accompanied by forming the hole. As a result, it has been found that if drilling using a drill is not performed on a sintered component having a relatively higher component but on a green body having a relatively lower hardness before sintering, enhancement of productivity and suppression of a reduction in tool life can be achieved. However, it has been revealed that if a hole is formed to provide a predetermined thin-walled portion, cracks tend to be occurred on an outer surface of the thin-walled portion. The present inventors have further intensively studied in order to suppress occurrence of cracks. As a result, it has been found that if a candle-type drill which is used for machining of a thinner member, such as a sheet material, is employed, it is possible to facilitate forming a hole without forming cracks as described above. The present invention is based on these findings, and contents of exemplary embodiments of the present invention will be first described.

(1) A method for manufacturing a sintered component according to one aspect of the present invention includes a molding step, a drilling step and a sintering step. The molding step is configured to press-mold a raw material powder containing a metal powder and thus to fabricate a green body. The drilling step is configured to form a hole in the green body using a candle-type drill and thus to form a thin-walled portion, of which a thickness Gt as measured between an inner circumferential surface of the hole and an outer surface of the green body is smaller than a diameter Gd of the hole. The sintering step is performed after the drilling step.

According to the above configuration, a sintered component, which has no defect, such as cracks, on the outer surface of the thin-walled portion, is obtained. The reason is that by using the candle-type drill in the drilling step, the green body having no defect on the outer surface of the thin-walled portion is obtained and then when the green body is sintered in the sintering step, a surface aspect of the resulting sintered component substantially maintains a surface aspect of the green body.

The reasons that the green body having no defect on the outer surface of the thin-walled portion is obtained in the drilling step are as follows. The candle-type drill has a point portion of such a shape that a stress which causes the hole to be expanded outward is hardly exerted on the green body. Accordingly, by using the candle-type drill, it is possible to machine the hole while reducing a load on the surroundings of the hole. Also, by using the candle-type drill, even in the case of the green body having a lower hardness than the sintered component, it is possible to facilitate to form the hole without forming defects, such as cracks, on the outer surface of the thin-walled portion of the green body. Meanwhile, since drilling is performed on the green body having such a lower hardness, the candle-type drill, which is originally used for drilling of a thinner member, such as a sheet material, can be employed.

The candle-type drill refers to a drill, in which the center of a point portion is of a candle shape, an angle (as measured toward the rear side of the drill) between straight lines connecting the center of the point portion with both outer ends (outer corners) of a cutting edge is a predetermined angle, and recesses (e.g., of a circular arc shape) are formed between the center and the outer ends. For example, the predetermined angles may be in the order of 140° or more and 220° or less.

Further, according to the above configuration, productivity of the sintered component can be enhanced. The reason is that since drilling is performed on the green body having a lower hardness than the sintered component, the hole can be efficiently formed as compared with the case where drilling is performed on the sintered component itself, thereby facilitating a reduction in drilling time. Further, the reason is that the candle-type drill can perform machining while reducing a load on the surroundings of the hole as described above and thus even if a machining speed is increased, a load on the surroundings of the hole is hardly increased, thereby facilitating an increase in machining speed.

Further, according to the above configuration, a reduction in life of the drill can be suppressed. The reason is that since drilling is performed on the green body having a lower hardness than the sintered component and also a drilling time can be reduced as described above, a reduction in machining load on the drill can be facilitated.

(2) In one mode of the method of manufacturing a sintered component as described above, the thickness Gt of the thin-walled portion may be Gd/5 or more and Gd/2 or less.

According to the above configuration, since the thickness Gt of the thin-walled portion is within the above range, it is possible to further suppress damage on the outer surface of the thin-walled portion.

(3) In one mode of the method of manufacturing a sintered component as described above, Gl may be Gd or more, where the Gl is an axial length of the hole.

Even if the hole is formed such that the length Gl of the hole is as long as the diameter Gd of the hole or more, the effects as described above, such as suppression of damage on the outer surface of the thin-walled portion, enhancement of productivity and suppression of a reduction in life of the drill, can be exhibited. The reason is that since drilling is performed on the green body having a lower hardness than the sintered component, the candle type drill, which is originally used for drilling of a sheet-shaped member or the like having a thickness thinner than a diameter of the drill, can be employed.

(4) A sintered component according to one aspect of the present invention has a hole formed therein and also includes a thin-walled portion having a thickness St as measured between an inner circumferential surface of the hole and an outer surface of the sintered component smaller than a diameter Sd of the hole, wherein a shape of the inner circumferential surface of the hole is a satin finish shape.

The sintered component of the above configuration has a good productivity. The reason is that even if the sintered component has the thin-walled portion, damage, such as cracks, is hardly occurred on the outer surface of the thin-walled portion. When a green body before sintering is drilled by a drill, bonding between metal powder particles thereof is weak and thus metal powder particles are cut while being scrapped by the drill, thereby form the hole. Accordingly, an inner circumferential surface of the hole formed in the green body has a satin finish shape in which concave and convex portions due to particles are formed overall. Since a surface aspect of the inner circumferential surface of the hole is substantially maintained even after sintering, an inner circumferential surface of a hole of a sintered component, which is obtained by sintering the green body having the hole formed therein, has also a satin finish shape. Namely, the fact that an inner circumferential surface of a hole formed in a sintered component has such a satin finish shape means that drilling using a drill is performed on a green body before sintering. Such a sintered component, in which an inner circumferential surface of a hole thereof has a satin finish shape, has a good productivity, as compared with conventional sintered components, in which a hole is formed after sintering.

(5) In one mode of the sintered component as described above, a ten point medial height Rz of the inner circumferential surface of the hole may be 20 μm or more.

When a hole is formed in a green body by a drill before sintering and then the green body is sintered, a ten point median height Rz of an inner circumferential surface of a hole formed in the resulting sintered component may be for example 20 μm, although varying depending on shapes/sizes of metal powder particles. In contrast, if a hole is formed by a drill after sintering, a ten point median height Rz of an inner circumferential surface of the hole formed in the sintered component is typically smaller than 20 μm.

Details of Exemplary Embodiments of the Invention

Now, details of exemplary embodiments of the present invention will be described with reference to the accompanying drawings. Meanwhile, it should be noted that the present invention is intended not to be limited to such examples, but to be defined by the appended claims and also to encompass all of changes within the meaning and scope of equivalency of the claims.

Embodiment 1

A method for manufacturing a sintered component according to the embodiment 1 includes a molding step of fabricating a green body, a drilling step of forming a hole in the green body, and a sintering step of sintering the green body after the drilling step. A principal feature of the method for manufacturing a sintered component is that a specific drill is used when forming a predetermined thin-walled portion by forming the hole at a predetermined location in the drilling step. The hole refers to an open hole (through-hole), which extends throughout, or a blind hole, which does not extend throughout. Hereinafter, each step will be described in detail, appropriately referring to FIG. 1.

[Molding Step]

The molding step is configured to press-molding a raw material powder containing a metal powder and thus to fabricate a green body. The green body is a material for a machine part, which will be productized through sintering as described below.

(Raw Material Powder)

The raw material powder essentially contains a metal powder. A material for the metal powder can be properly selected depending on a material of a sintered component to be manufactured and typically includes iron-based materials. The iron-based materials mean iron or iron alloy, whose main constituent is iron. The iron alloy includes alloy containing one or more additive elements selected, for example, from Ni, Cu, Cr, Mo, Mn, C, Si, Al, P, B, N and Co. Specifically, the iron alloy includes stainless steel, Fe—C alloy, Fe—Cu—Ni—Mo alloy, Fe—Ni—Mo—Mn alloy, Fe—P alloy, Fe—Cu alloy, Fe—Cu—C alloy, Fe—Cu—Mo alloy, Fe—Ni—Mo—Cu—C alloy, Fe—Ni—Cu alloy, Fe—Ni—Mo—C alloy, Fe—Ni—Cr alloy, Fe—Ni—Mo—Cr alloy, Fe—Cr alloy, Fe—Mo—Cr alloy, Fe—Cr—C alloy, Fe—Ni—C alloy, Fe—Mo—Mn—Cr—C alloy and the like. By essentially containing an iron-based material powder, an iron-based sintered component is obtained. If an iron-based material powder is essentially contained, a content thereof may be set to, for example, 90 mass % or more, further 95 mass % or more, assuming that the raw material powder is 100 mass %.

When an iron-based material powder, in particular an iron powder is essentially contained, metal powders, such as Cu, Ni and Mo, may be added as alloy constituents. Cu, Ni and Mo are elements intended to enhance hardenability, and an amount of addition thereof may be set to, for example, more than 0 mass % and 5 mass % or less, further 0.1 mass % or more and 2 mass % or less, assuming that the raw material powder is 100 mass %. Also, a nonmetallic inorganic material, such as carbon (graphite) powder may be added. C is an element intended to enhance strength of a sintered body or heat-treated body, and a content thereof may be set to, for example, more than 0 mass % and 2 mass % or less, further 0.1 mass % or more and 1 mass % or less, assuming that the raw material powder is 100 mass %.

Preferably, the raw material powder contains a lubricant. By containing the lubricant in the raw material powder, when the raw material powder is press-molded to fabricate a green body, lubricity upon molding can be increased and thus moldability can be enhanced. Therefore, even if a pressure for press-molding is lower, a densified green body can be easily obtained and thus a high-density sintered component can also be easily obtained. Further, if the lubricant is mixed with the raw material powder, the lubricant is dispersed inside the green body and thus also serves as a lubricant for a drill when the green body is drilled with the drill in the subsequent step. Therefore, a cutting resistance (thrust load) can be reduced or a tool life can be improved.

For example, the lubricant includes metal soaps, such as zinc stearate and lithium stearate; fatty acid amides such as stearic acid amide; higher fatty acid amides such as ethylene-bis-stearic acid amide and the like. The lubricant may take any form, such as solid form, powder form or liquid form. A content of the lubricant may be set to, for example, 2 mass % or less, further 1 mass % or less, assuming that the raw material powder is 100 mass %. If a content of the lubricant is 2 mass % or less, it is possible to increase a proportion of metal powder to be contained in a green body. Accordingly, even if a pressure for press-molding is lower, a densified green body can be easily obtained. Further, it is possible to suppress a volumetric shrinkage due to dissipation of the lubricant when the green body is sintered in the subsequent step. As a result, a high-density sintered component having a higher dimension precision can be easily obtained. From the point of view that the effect of enhancing lubricity is obtained, the content of the lubricant preferably is set to 0.1 mass % or more, further 0.5 mass % or more.

The raw material powder contains no organic binder. Since no organic binder is contained in the raw material powder, a proportion of metal powder to be contained in a green body can be increased. Accordingly, even if a pressure for press-molding is lower, a densified green body can be easily obtained. In addition, there is no need to degrease the green body in the subsequent step.

The raw material powder essentially consists of the metal powder as described above and is also permitted to contain inevitable impurities.

As the metal powder described above, water atomized powder, reduction powder, gas atomized powder and the like may be employed, and among others, water atomized powder or reduction powder are preferable. The water atomized powder or reduction powder has a lot of concave and convex portions formed on a surface of particles. Accordingly, concave and convex portions of particles are engaged with each other during molding, thereby enhancing a shape retaining ability of the green body. In general, from the gas atomized powder, particles having a few of concave and convex portions on a surface thereof are apt to be obtained, whereas from the water atomized power or reduction powder, particles having a lot of concave and convex portions on a surface thereof are apt to be obtained.

The metal powder may have an average particle diameter of, for example, 20 μm or more, 50 μm or more and 150 μm or less. The average particle diameter of the metal powder is a particle diameter (D50), at which a cumulative volume in a volumetric particle size distribution as measured by a laser diffraction particle size measuring device becomes 50%. So long as the average particle diameter of the metal powder is within the above range, treating thereof is easy and thus press-molding is facilitated.

(Press-Molding)

For press-molding, a suitable molding apparatus (mold), by which a shape corresponding to a final shape of machine parts can be molded, is employed. The shape of machine parts mostly is a cylindrical shape, which has a circular axial bore formed at the center thereof. Such cylindrical-shaped machine parts are fabricated by press-molding in an axial direction of cylinder. The machine parts includes a machine part, in which a through-hole (used as an oil hole) or blind hole is formed to extend from an outer circumferential surface thereof to be perpendicular to the axial bore. The through-hole or blind hole cannot be integrally formed during molding of the green body and thus has to be formed by the drilling step as described below.

Figure 1:
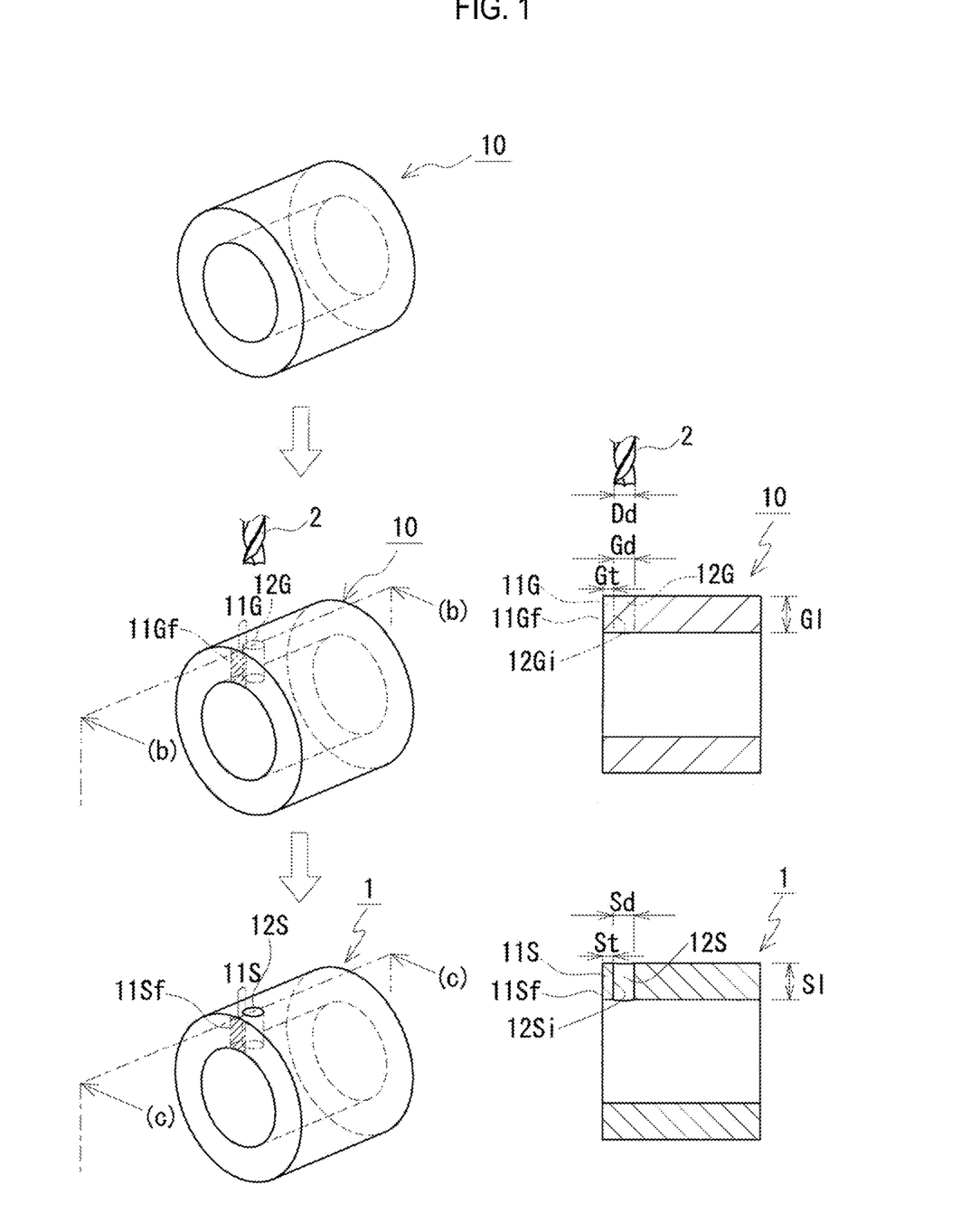
FIG. 1 is a process explanatory view explaining a method for manufacturing a sintered component according to Embodiment 1.

Herein, for convenience of explanation, the shape of the green body 10 is shown as a cylindrical shape as in views on the top and middle of FIG. 1. The green body 10 may be formed, for example, using upper and lower punches having a circular ring-shaped pressing surface for forming both end surfaces of the green body 10, a circular columnar-shaped inner die configured to be inserted into the insides of the upper and lower punches for forming an inner circumferential surface of the green body 10, and an outer die configured to surround outer circumferences of the upper and lower punches and having an circular insertion hole formed therein for forming an outer circumferential surface of the green body 10. Both axial end surfaces of the green body 10 are surfaces, which are pressed by the upper and lower punches, the inner and outer circumferential surfaces thereof are surfaces in sliding contact with the dies, and an axial bore thereof is integrally formed during molding.

A pressure for the press molding may be 250 MPa or more and 800 MPa or less.

[Drilling Step]

In the drilling step, a hole 12G is formed in the green body 10 using a candle-type drill 2, thereby forming a thin-walled portion 11G (see views on the middle of FIG. 1). The hole 12G may be a through hole or blind hole, but herein is shown as a through hole. The thin-walled portion 11G means a section, which is formed between an inner circumferential surface 12Gi of the hole 12G and an outer surface (end surface) of the green body 10 and of which a thickness Gt as measured between the inner circumferential surface 12Gi of the hole 12G and the outer surface (end surface) of the green body 10 is smaller than a diameter Gd of the hole 12G (diameter Dd of the candle-type drill)(see a sectional view on the right side of the middle of FIG. 1). Namely, in the drilling step, the hole 12G is formed at a location where the thickness Gt of the thin-walled portion 11G formed by forming the hole 12G becomes smaller than the diameter Gd of the hole 12G.

The green body 10 shown in views on the middle of FIG. 1 is a cylindrical body before forming the thin-walled portion 11G and the hole 12Q and thus the thin-walled portion 11G and the hole 12G are shown by two-dot chain lines. The sectional view of the green body 10 on the right side of the middle of FIG. 1 is a sectional view taken along a broken line (b)-(b) in an entire perspective view on the left side of the middle of FIG. 1.

By using the candle-type drill 2, suppression of damage to the outer surface 11Gf of the thin-walled portion 11G is facilitated. The reason is that the candle-type drill 2 has a point portion of such a shape that a stress which causes the hole 12G to be expanded outward is hardly exerted on the green body 10. Since a stress which causes the hole 12G to be expanded outward is hardly exerted thereon, the thin-walled portion 11G is hardly deformed during drilling and thus the outer surface 11Gf is also hardly deformed or damaged. Meanwhile, since drilling is performed on the green body 10, which has a lower hardness than a sintered component 1, it is possible to employ the candle-type drill 2, which is originally used for drilling of a thinner member, such as a sheet material. This is equally applied to a blind hole as well as a through-hole.

The candle-type drill 2 refers to a drill, in which the center of a point portion is of a candle shape, an angle (as measured toward the rear side of the drill) between straight lines connecting the center of the point portion with both outer ends (outer corners) of a cutting edge is a predetermined angle, and recesses (e.g., of a circular arc shape) are formed between the center and the outer ends. For example, the predetermined angles may be in the order of 140° or more and 220° or less. As the candle-type drill 2, any known ones may be employed.

The outer surface 11Gf of the thin-walled portion 11G refers to a projection area (indicated by hatching in the entire perspective view on the left side of the middle of FIG. 1) of the hole 12G on the end surface of the green body 10 in an axial direction of the green body 10. Namely, a width of the outer surface 11Gf is equal to the diameter of the hole 12G.

Since drilling is performed on the green body 10 having a lower hardness than the sintered component 1, the hole 12G can be efficiently formed as compared with the case where drilling is performed on the sintered component 1, thereby facilitating a reduction in drilling time.

Also, even if drilling is performed on the green body 10 having a lower hardness than the sintered component 1, the candle-type drill 2 can perform machining while reducing a load on the surroundings of the hole 12G as described above, thereby facilitating an increase in machining speed.

Further, a reduction in life of the drill can be suppressed. The reason is that since drilling is performed on the green body 10 having a lower hardness than the sintered component 1 and also the drilling time can be reduced as described above, a reduction in machining load on the drill can be facilitated.

The thickness Gt of the thin-walled portion 11G preferably is Gd/5 or more and Gd/2 or less (Dd/5 or more and Dd/2 or less). Since the thickness Gt of the thin-walled portion 11G is within the above range, it is possible to further suppress damage on the outer surface 11Gf of the thin-walled portion 11G Although varying depending on the diameter Gd of the hole 12Q the thickness Gt of the thin-walled portion 11G may be, for example, 0.01 mm or more and 10 mm or less, further 0.5 mm or more and 10 mm or less.

Even when drilling is performed, a surface aspect of the outer surface 11Gf of the thin-walled portion 11G is substantially remained in a state immediately after press-molding. The reason is that even if drilling is performed on the green body 10, suppression of damage on the outer surface 11Gf of the thin-walled portion 11G is facilitated as described above. The surface aspect of the outer surface 11Gf is practically maintained even after sintering as described below.

The diameter Gd of the hole 12G (diameter Dd of the candle-type drill) is preferably selected such that a diameter Sd of a hole 12S of the sintered component 1 is within a predetermined range, in consideration of that the sintered component 1 (see views on the bottom of FIG. 1) has a shrunken size as compared with that of the green body 10 due to sintering of the green body 10. For example, the diameter Gd of the hole 12G (diameter Dd of the candle-type drill) may be 0.2 mm or more and 50 mm or less.

An axial length Gl of the hole 12G may be set to the diameter Gd of the hole 12G (diameter Dd of the candle-type drill 2) or more. By doing so, even if the hole 12G is formed such that the length Gl of the hole 12G is as long as the diameter Gd of the hole 12G (diameter Dd of the candle-type drill 2) or more, the effects as described above, such as suppression of damage on the outer surface 11Gf of the thin-walled portion 11Q enhancement of productivity and suppression of a reduction in life of the drill, can be exhibited. The reason is that since drilling is performed on the green body 10 having a lower hardness than the sintered component 1, the candle type drill 2, which is originally used for drilling of a sheet-shaped member or the like having a thickness thinner than a diameter of the drill, can be employed. The length Gl of the hole 12G may be further set to 2Gd (2Dd) or more, particularly 3Gd (3Dd) or more. The length Gl of the hole 12G may be approximately 15Gd (15Dd) or less.

The inner circumferential surface 12Gi of the hole 12G is formed in a satin finish shape. In the green body 10 before sintering, bonding between metal powder particles is weak. When the green body 10 is drilled by the drill 2, metal powder particles are cut while being scrapped by the drill 2, thereby form the hole 12G As a result, concave and convex portions due to particles are formed overall on the inner circumferential surface 12Gi of the hole 12G formed in the green body 10. The satin finish shaped inner circumferential surface 12Gl is practically maintained even after sintering.

(Machining Condition)

The number of revolutions or a feed rate of the candle-type drill 2 may be properly set depending on the thickness Gt of the thin-walled portion 11G and a size of the hole 12G (diameter Gd and length Gl). The number of revolutions or the feed rate of the candle-type drill 2 may be fast to be suitable for mass production. The number of revolutions of the candle-type drill 2 may be set to, for example, 4000 rpm or more, further 6000 rpm or more, particularly 10000 rpm or more. The feed rate of the candle-type drill 2 may be set to, for example, 800 mm/min or more, further 1600 mm/min or more, particularly 2000 mm/min or more.

In the case of a normal drill used for drilling of a sintered component, when the green body 10 is machined using the normal drill, cracks can be easily occurred on the outer surfaces of the thin-walled portion 11G, as the number of revolutions becomes higher and the feed rate becomes faster. Herein, the normal drill refers to, for example, a drill in which a point angle of a point portion thereof is configured as a single stage (often also referred to as a V-shaped drill), a drill in which a point angle of a point portion thereof is configured as a double stage (often also referred to as a double angle drill), and the like. In contrast, since the candle type drill 2 facilitates performing drilling while hardly exerting a stress, which causes the hole 12G to be expanded outward, on the green body 10, the candle-type drill 2 can perform machining at the higher number of revolutions or the faster feed rate as described above. As a result, enhancement of productivity and suppression of a reduction in tool life can be facilitated.

[Sintering Step]

In the sintering step, the green body 10 drilled as described above is sintered. Due to this sintering, the sintered component 1 as described in detail below is obtained (see views on the bottom of FIG. 1). Sintering may be performed using any suitable sintering furnaces (not shown). A temperature for sintering may be properly selected from any temperatures required for sintering depending on materials of the green body 10 and may be, for example, 1000° C. or more, further 1100° C. or more, particularly 1200° C. or more. A sintering time may be approximately 20 minutes or more and 150 minutes or less.

[Sintered Component]

The sintered component 1 has a hole 12S formed therein and a thin-walled portion 11S formed between an inner circumferential surface 12Si of the hole 12S and an outer surface (end surface) of the sintered component 1 and having a thickness St smaller than a diameter Sd of the hole 12S (see views on the bottom of FIG. 1). A sectional view of the sintered component 1 on the right side of the bottom of FIG. 1 is a sectional view taken along a broken line (c)-(c) in an entire perspective view on the left side of the bottom of FIG. 1.

The sintered component 1 has a size shrunken as compared with that of the green body 10 due to sintering, but relationships of the thickness St of the thin-walled portion 11S, the hole Sd of the hole 12S and an axial length Sl of the hole 12S in the sintered component 1 are the same as relationships of the thickness Gt of the thin-walled portion 11Q the hole Gd of the hole 12G and the axial length Gl of the hole 12G in the green body 10. The reason is that the thickness St of the thin-walled portion 11S, the hole Sd of the hole 12S and the axial length Sl of the hole 12S in the sintered component 1 are respectively depended on the thickness Gt of the thin-walled portion 11Q the hole Gd of the hole 12G and the axial length Gl of the hole 12G in the green body 10.

No damage, such as cracks, is occurred on the outer surface 11Sf of the thin-walled portion 11S. The outer surfaces 11Sf is indicated by hatching in the entire perspective view on the left side of the bottom of FIG. 1. The reason is that as described above, a surface aspect and the like of the sintered component 1 substantially maintains the surface aspect of the green body 10. The sintered component 1 is obtained by sintering the green body 10, as described above, which has no crack and the like occurred on the outer surface 11Gf itself. Namely, when the green body 10 is drilled by the drill 2 as described above, no crack is occurred on the outer surface 11Gf of the thin-walled portion 11G of the green body 10, and as a result, also in the case of the sintered component 1 obtained by sintering the green body 10, no damage, such as cracks, is occurred on the outer surface 11Sf of the thin-walled portion 11S.

A shape of the inner circumferential surface 12Si of the hole 12S has a stain-like shape. The reason is that as described above, the surface aspect of the inner circumferential surface 12Gi of the hole 12G is substantially maintained even after sintering. As described above, when the green body 10 is drilled by the drill 2, the inner circumferential surface 12Gi of the hole 12G of the green body 10 has the satin finish shape, and as a result, also in the case of the sintered component 1 obtained by sintering the green body 10, the inner circumferential surface 12Si of the hole 12S has a satin finish shape. In contrast, if a hole is formed in a sintered component by a drill after sintering, a shape of an inner circumferential surface of the hole formed in the sintered component is an overall smooth shape having a few of concave and convex portions and thus becomes a shiny (mirror surface) state.

A ten point median height Rz of the inner circumferential surface 12Si of the hole 12S varies depending on shapes/sizes of metal powder particles. An upper limit of the ten point median height Rz of the inner circumferential surface of the hole 12i may be, for example, 150 μm or less. In contrast, if a hole is formed in a sintered component by a drill after sintering, a ten point median height Rz of an inner circumferential surface of the hole formed in the sintered component is typically smaller than 20 μm, further 15 μm or less.

Action and Effects

The embodiment 1 as described above can exhibit the following effects.

(1) The sintered component 1, which has no defect, such as cracks, on the outer surface 11Sf of the thin-walled portion 11S, is obtained. The reason is that by using the candle-type drill 2 in the drilling step, the green body 10 having no defect on the outer surface 11Gf of the thin-walled portion 11G is obtained and then when the green body 10 is sintered in the sintering step, a surface aspect of the resulting sintered component 1 substantially maintains a surface aspect of the green body 10.

The reasons that the green body 10 having no defect on the outer surface 11Gf of the thin-walled portion 11G is obtained in the drilling step are as follows. The candle-type drill 2 has a point portion of such a shape that a stress which causes the hole 12G to be expanded outward is hardly exerted on the green body 10. Accordingly, by using the candle-type drill 2, even in the case of the green body 11 having a lower hardness than the sintered component 1, it is possible to facilitate forming the hole 12G without forming defects, such as cracks, on the outer surface 11Gf of the thin-walled portion 11G of the green body 11. Since drilling is performed on the green body 11 having such a lower hardness, the candle-type drill 2, which is originally used for drilling of a thinner member, such as a sheet material, can be employed.

(2) Productivity of the sintered component 1 can be enhanced. The reason is that since drilling is performed on the green body 11 having such a lower hardness than the sintered component 1, the hole 12G can be efficiently formed as compared with the case where drilling is performed on the sintered component 1 itself, thereby facilitating a reduction in drilling time. Further, the reason is that even if drilling is performed on the green body 10 having a lower hardness than the sintered component 1, the candle-type drill 2 can perform machining while reducing a load on the surroundings of the hole 12G as described above and thus even if a machining speed is increased, a load on the surroundings of the hole 12G is hardly increased, thereby facilitating an increase in machining speed.

(3) A reduction in life of the drill can be suppressed. The reason is that since drilling is performed on the green body 10 having a lower hardness than the sintered component 1 and also a drilling time can be reduced as described above, a reduction in machining load on the drill can be facilitated.

(4) Even if the sintered component 1 has the thin-walled portion 11S, no damage, such as cracks, is formed on the outer surface 11Sf of the thin-walled portion 11S, thereby achieving a good productivity.

Test Example 1

Green bodies, in which through-holes was formed and thus thin-walled portions were formed, were fabricated through the molding step and the drilling step described with respect to the method for manufacturing a sintered component according to the embodiment 1, and then whether defects, such as cracks were present or absent on an outer surface of the thin-walled portion of the green bodies was checked.

[Molding Step]

As a raw material powder, a mixed powder was prepared by mixing a water atomized iron powder (D50: 100 μm), a copper powder (D50: 30 μm), a carbon powder (D50: 20 μm) and ethylene-bis-stearic acid amide.

Subsequently, the raw material power was filled in a predetermined mold, by which a cylindrical green body as shown in FIG. 1 was obtained, and then was press-molded at a pressing pressure of 600 MPa. In this way, green bodies having a thickness of 7 mm (inner diameter: 20 mm, outer diameter: 34 mm) and an axial length of 20 mm were fabricated. A density of green bodies was 6.9 g/cm$^3$. This density was an apparent density as calculated from size and mass.

[Drilling Step]

Subsequently, a thin-walled portion was formed by forming through-holes in the green bodies using a drill. As the drill, a candle-type drill (ZH342-ViO produced by RYOCO-SEIKI.CO, φ: 4 mm) and a double angle drill (φ: 4 mm, first point angle: 135°, second point angle: 60°) were employed. As the double angle drill, a drill obtained by grinding both outer ends (outer corners) of a point portion of a super multi drill (MDW0400HGS produced by Sumitomo Electric Hardmetal Co.) to form the above second point angle was employed.

The number of revolutions of each drill was set to 10000 rpm. A feed rate of each drill was set to 800 mm/min on the vicinity of an entrance (from an outer circumferential surface of the green bodies to a drilling depth of 3 mm) and then to feed rates (mm/min) as shown in Table 1, until an exit was opened. Forming through-holes (Gd: 4 mm, Gl: 7 mm (see FIG. 1)) was performed by drilling the green bodies from an outer circumferential surface thereof toward a center axis thereof. At that time, approximately middle portions between adjacent though-holes among three through-holes to be formed were held by a chuck. Locations where through-holes were formed were set to locations where the outer circumferential surface of the green bodies was circumferentially divided into three equal parts and also a thickness Gt (mm) of the thin-walled portion as shown in Table 1 was obtained. Green bodies which were drilled using the candle type drill were referred to as Sample Nos. 1-1 to 1-12, and green bodies which were drilled using the double angle drill were referred to as Sample Nos. 1-101 to 1-112.

An outer surface of each thin-walled portion formed by forming each through-hole was observed, and thus whether cracks were present or absent was checked. The results are shown in Table 1. The remark "Present" in Table 1 means that cracks were formed on at least one of three outer surfaces, and the remark "Absent" in Table 1 means that cracks were not formed on any of three outer surfaces.

TABLE 1

| Sample No. | Feed Rate mm/min | Thickness Gt of Thin-walled Portion mm | Cracks Present or Absent |
|---|---|---|---|
| 1-1 | 800 | 3 | Absent |
| 1-2 | 800 | 2 | Absent |
| 1-3 | 800 | 1 | Absent |

TABLE 1-continued

| Sample No. | Feed Rate mm/min | Thickness Gt of Thin-walled Portion mm | Cracks Present or Absent |
|---|---|---|---|
| 1-4 | 800 | 0.8 | Absent |
| 1-5 | 1600 | 3 | Absent |
| 1-6 | 1600 | 2 | Absent |
| 1-7 | 1600 | 1 | Absent |
| 1-8 | 1600 | 0.8 | Absent |
| 1-9 | 2000 | 3 | Absent |
| 1-10 | 2000 | 2 | Absent |
| 1-11 | 2000 | 1 | Absent |
| 1-12 | 2000 | 0.8 | Absent |
| 1-101 | 800 | 5 | Absent |
| 1-102 | 800 | 3 | Present |
| 1-103 | 800 | 2 | Present |
| 1-104 | 800 | 1 | Present |
| 1-105 | 1600 | 5 | Absent |
| 1-106 | 1600 | 3 | Present |
| 1-107 | 1600 | 2 | Present |
| 1-108 | 1600 | 1 | Present |
| 1-109 | 2000 | 5 | Absent |
| 1-110 | 2000 | 3 | Present |
| 1-111 | 2000 | 2 | Present |
| 1-112 | 2000 | 1 | Present |

As shown in Table 1, all of Sample Nos. 1-1 to 1-12 which were drilled using the candle type drill had no crack. On the other hand, in the case of samples which were drilled using the double angle drill, Sample Nos. 1-101, 1-105 and 1-109 had no crack, but Sample Nos. 1-102 to 1-104, 1-106 to 1-108 and 1-110 to 1-112 had cracks formed thereon.

Test Example 2

A green body, which was obtained through the molding step and the drilling step described with respect to the method for manufacturing a sintered component according to the embodiment 1, and a sintered components, which was obtained by additionally performing the sintering step on the green bodies, were fabricated and then an inner circumferential surface of a through-hole of the green body and an inner circumferential surface of a through-hole of the sintered component were observed.

In this case, the molding step and the drilling step were performed in the same manner as the case of Sample No. 1-7 in Test Example 1, except that a diameter φ of the candle-type drill was 3 mm. In the sintering step, the green body, which were fabricated though the drilling step, was sintered at a temperature of 1130° C. during 20 minutes, and thus Sample No. 2-1 of the sintered component was fabricated.

Figure 2:
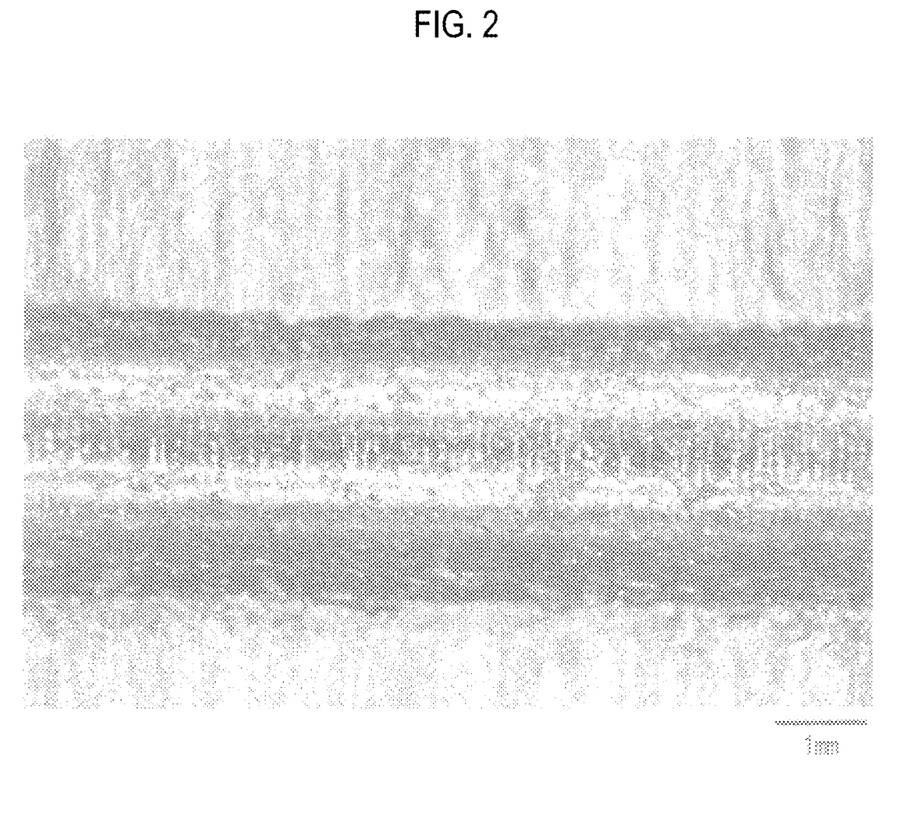
FIG. 2 is a microscope image showing a through-hole of Sample No. 2-1 of green bodies fabricated in Test Example 2.

A longitudinal cross section of the through-hole of the green body was taken along an axial direction thereof and then the inner circumferential surface of the though-hole was observed by an optical microscope. A photograph of the cross section is shown in FIG. 2. A band-shaped portion laterally extending as shown in the middle of FIG. 2 is the inner circumferential surface of the through-hole. As shown in this figure, a shape of the inner circumferential surface of the though-hole is a satin finish shape. A ten point median height Rz of the inner circumferential surface was measured as 40 μm. The ten point median height Rz was performed in accordance with the standard "Geometrical Product Specifications (GPS)—Surface texture: Profile method—Terms, definitions and surface texture parameters JIS B0601 (2013) ".

In the same manner as the case of the inner circumferential surface of the through-hole of the green body, the inner circumferential surface of the through-hole of the sintered component was observed and then a ten point median height Rz of the inner circumferential surface was measured. As a result, like the green body, a shape of the inner circumferential surface of the though-hole of the sintered component was a satin finish shape and also the ten point median height Rz of the inner circumferential surface was the same as that of the green body.

In contrast, although not shown, a through-hole was formed in a sintered component after sintering by the double angle drill as described in Test Example 1, and an inner circumferential surface of the though-hole was observed in the same manner. A shape of the inner circumferential surface of the through-hole was a generally flat shape and thus a mirror surface state, and also a ten point median height Rz thereof was 11 μm.

Appendix

With regard to the embodiments of the present invention, an additional appendix is disclosed as follows.

[Appendix 1]

A method for manufacturing a sintered component, including:

a molding step of press-molding a raw material powder containing a metal powder and thus fabricating a green body;

an entrance-drilling step of forming an entrance of a hole in the green body using a candle-type drill; and a sintering step of sintering the green body after the entrance-drilling step.

According to the method for manufacturing a sintered component of the above Appendix 1, it is possible to facilitate obtaining a sintered component, which has a reduced number of edge chipping on a peripheral edge of the entrance of the hole. The reason is thought that as compared with conventional normal drills used for drilling of sintered components, the candle-type drill has a smaller point angle and tends to create a reduced amount of chips on the entrance side, and as a result a thrust load thereon is smaller on the entrance side of the hole and also fluctuation in thrust load is smaller. Also, according the method for manufacturing a sintered component, the entrance side of the hole is formed by the candle-type drill, but an exit side of the hole may be formed using a drill other than the candle-type drill. Alternatively, the method is suitable for manufacturing a sintered component, in which only an entrance of a hole is formed and thus the hole does not extend therethrough, but has a bottom.

Reference Example 1

Entrance-drilling of forming an entrance of a hole was performed on green bodies, which were fabricated through the same molding step as that of Test Example 1, using a V-shaped drill (point angle: 135°) in addition to the candle-type drill and the double angle drill used in Test Example 1, and fluctuation in thrust load (N) on each drill was measured.

In this case, a size of green bodies was set to have a thickness of 18 mm (inner diameter: 17 mm, outer diameter: 53 mm) and an axial length of 20 mm. Entrance-drilling was performed at a feed rate of 800 mm/min from an outer circumferential surface of the green bodies up to a depth of 5 mm, and then at a feed rate of 1600 mm/min from 5 mm up to a predetermined depth.

Figure 3:
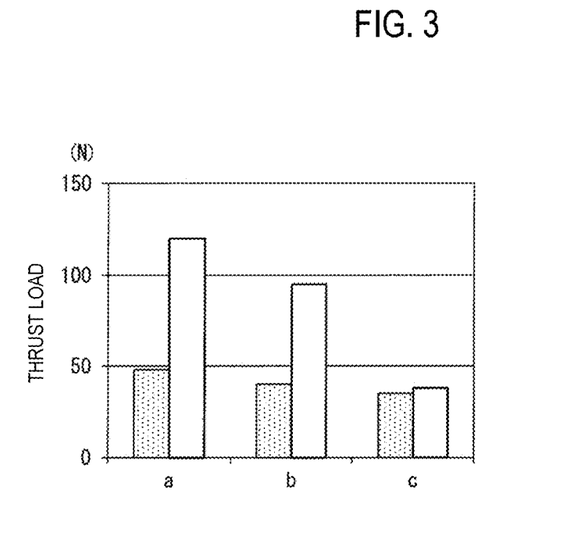
FIG. 3 is a graph showing thrust loads on drills a to c used when forming an entrance of a hole in Reference Example 1.

At that time, fluctuation in thrust load from the outer circumferential surface up to the predetermined depth was measured. A cutting dynamometer (Model No. 9272 produced by Kistler Japan Co., Ltd.) was used for measuring fluctuation in thrust load. A maximum thrust load when a feed rate was 800 mm/min and a maximum thrust load when a feed rate was 1600 mm/min are shown in a graph of FIG. 3. In FIG. 3, the reference character a refers to maximum thrust loads on the V-shaped drill, b refers to maximum thrust loads on the double angle drill and c refers to maximum thrust loads on the candle-type drill. In each of drills a to c, the left side is a maximum thrust load at a feed rate of 800 mm/min and the right side is a maximum thrust load at a feed rate of 1600 mm/min.

As shown in the graph of FIG. 3, it can be known that a maximum thrust load on the candle-type drill c on the entrance side is smaller as compared with the V-shaped drill a and the double angle drill b. Also, it can be known that the candle-type drill c has a very small difference in maximum thrust load between the entrance side and the subsequent section. In contrast, the V-shaped drill a and the double angle drill b have a very large difference in maximum thrust load between the entrance side and the subsequent section.

Figure 4:
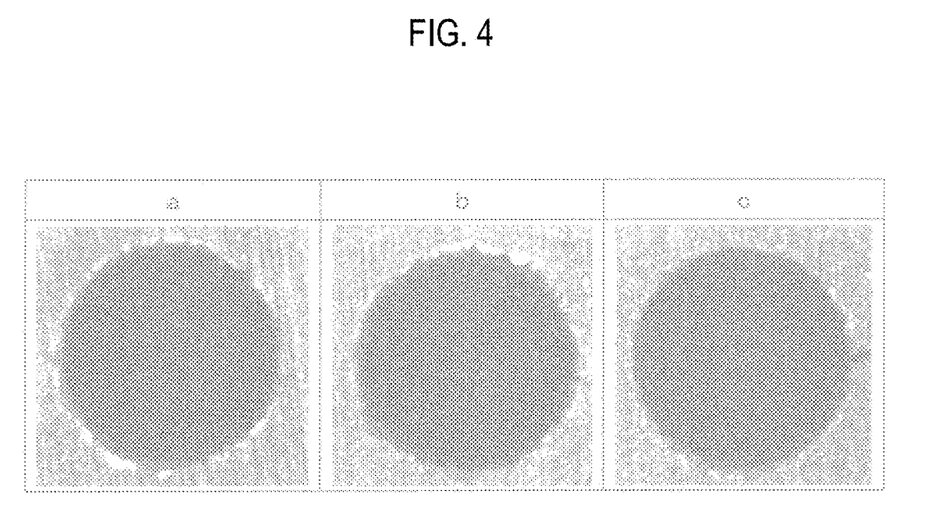
FIG. 4 is a microscope image showing entrances of holes formed using the drills a to c in Reference Example 1.

Optical microscope images of entrances of holes when entrance-drilling was performed using each of the drills a to c is shown in FIG. 4. As shown in FIG. 4, it can be known that an entrance of a hole formed by the candle-type drill c has a very few of edge chippings on a peripheral edge thereof. In contrast, it can be known that entrances of holes formed by the V-shaped drill a and the double angle drill b have a very lot of edge chippings on a peripheral edge thereof.

From FIGS. 3 and 4, it can be known that since the thrust load is smaller on the entrance side of the hole and also the fluctuation in thrust load is smaller, it is possible to facilitate reducing the number of edge chippings on the peripheral edge of the entrance. The reason of this result is thought that as compared with normal drills used for drilling of sintered components, such as the V-shaped drill and the double angle drill, the candle-type drill has a smaller point angle and thus tends to create a reduced amount of chips on the entrance side. Therefore, it is thought that as an amount of chips are reduced, contact of chips with the peripheral edge of the hole when chips are discharged can be reduced and thus damage thereto is hardly occurred.

This application is based on Japanese Patent Application No. 2014-252532 filed on Dec. 12, 2014, the entire contents of which are incorporated herein by reference.

INDUSTRIAL APPLICABILITY

The method for manufacturing a sintered component according to one aspect of the present invention can be suitably used for manufacturing various general structural components (sintered components, such as sprockets, rotors, gears, rings, flanges, pulleys, bearings and any other machine parts). The sintered component according to one aspect of the present invention can be suitably used for various general structural components (sintered components, such as sprockets, rotors, gears, rings, flanges, pulleys, bearings and any other machine parts).

REFERENCE NUMERALS LIST

1 Sintered component
10 Green body
11G, 11S Thin-walled portion
11Gf, 11Sf Outer surface
12G 12S Hole
12Gi, 12Si Inner circumferential surface
2 Candle-type drill

The invention claimed is:

1. A method for manufacturing a sintered component, comprising:
   a molding step of press-molding a raw material powder containing a metal powder and thus fabricating a green body;
   a drilling step of forming a hole in a side of the green body using a candle-type drill in which a center of a point portion is of a candle shape, an angle between straight lines connecting the center of the point portion with both outer ends of a cutting edge is in the order of 140° or more and 220° or less, and recesses are formed between the center and the outer ends, and thus forming a thin-walled portion, of which a thickness Gt as measured between an inner circumferential surface of the hole and an outer surface of the green body is smaller than a diameter Gd of the hole; and
   a sintering step of sintering the green body after the drilling step.

2. The method according to claim 1, wherein the thickness Gt of the thin-walled portion is Gd/5 or more and Gd/2 or less.

3. The method according to claim 2, wherein Gl is Gd or more, where the Gl is an axial length of the hole.

4. The method according to claim 1, wherein Gl is Gd or more, where the Gl is an axial length of the hole.

5. The method according to claim 1, wherein the hole is a through-hole passing through the side of the green body.

6. The method according to claim 1, wherein an axial direction of the hole is perpendicular to an axial direction of the green body.

* * * * *